United States Patent
McDonald et al.

(10) Patent No.: US 11,334,491 B1
(45) Date of Patent: May 17, 2022

(54) SIDE CACHE ARRAY FOR GREATER FETCH BANDWIDTH

(71) Applicant: CENTAUR TECHNOLOGY, INC., Austin, TX (US)

(72) Inventors: Thomas C. McDonald, Austin, TX (US); John Duncan, Austin, TX (US)

(73) Assignee: CENTAUR TECHNOLOGY, INC., Austin, TX (US)

( * ) Notice: Subject to any disclaimer, the term of this patent is extended or adjusted under 35 U.S.C. 154(b) by 64 days.

(21) Appl. No.: 16/950,942

(22) Filed: Nov. 18, 2020

(51) Int. Cl.
*G06F 12/0875* (2016.01)

(52) U.S. Cl.
CPC .... *G06F 12/0875* (2013.01); *G06F 2212/452* (2013.01)

(58) Field of Classification Search
CPC ........... G06F 12/0875; G06F 2212/452; G06F 9/30145–30152
See application file for complete search history.

(56) References Cited

U.S. PATENT DOCUMENTS 5,809,273 A * 9/1998 Favor ................. G06F 9/30152
712/213

FOREIGN PATENT DOCUMENTS

| EP | 0825529 | * | 2/1998 | ........... G06F 9/3802 |
| KR | 20090018928 | * | 2/2009 | ........... G06F 9/3816 |
| WO | WO 9117496 | * | 11/1991 | ........... G06F 9/3885 |

OTHER PUBLICATIONS

Pan, Heidi, and Krste Asanović. "Heads and tails: a variable-length instruction format supporting parallel fetch and decode." Proceedings of the 2001 International Conference on Compilers, Architecture, and Synthesis for Embedded Systems. 2001. (Year: 2001).*
Solomon, Baruch, et al. "Micro-operation cache: A power aware frontend for variable instruction length isa." IEEE Transactions on Very Large Scale Integration (VLSI) Systems 11.5 (2003): 801-811. (Year: 2003).*
English Translation of Morrow KR 20090018928 (Year: 2009).*

* cited by examiner

*Primary Examiner* — Charles Rones
*Assistant Examiner* — Hewy H Li
(74) *Attorney, Agent, or Firm* — McClure, Qualey & Rodack, LLP

(57) ABSTRACT

In one embodiment, a microprocessor, comprising: an instruction cache configured to receive an instruction fetch comprising a first byte portion and a second byte portion; a side cache tag array configured to signal further processing of the second byte portion in addition to the first byte portion based on a hit of the side cache tag array; and a side cache data array configured to store instruction data for the second byte portion.

18 Claims, 4 Drawing Sheets

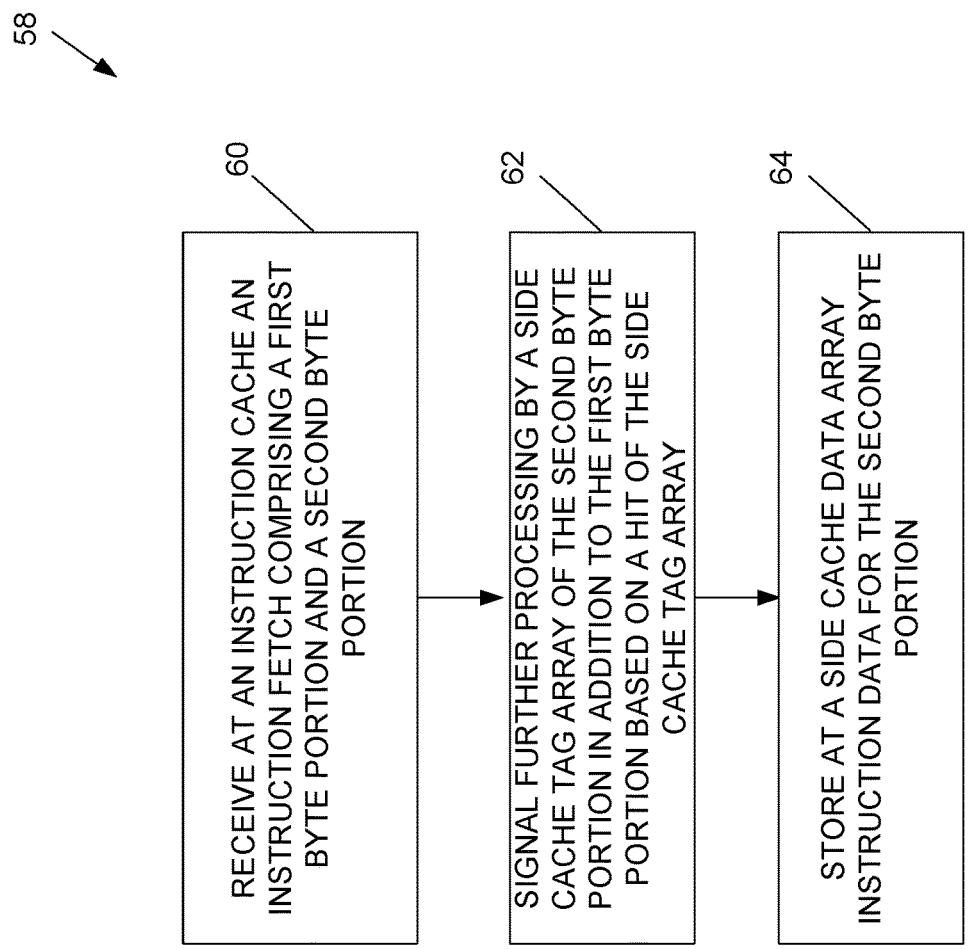

SIDE CACHE ARRAY FOR GREATER FETCH BANDWIDTH

TECHNICAL FIELD

The present invention relates in general to microprocessors, and in particular, instruction fetch bandwidth in microprocessors.

BACKGROUND

Microprocessors include one or more execution units that perform the actual execution of instructions. Superscalar processors include the ability to issue multiple instructions per clock cycle to the various execution units to improve the throughput, or average instructions per clock cycle, of the processor. The instruction fetch and decoding functions at the top of the microprocessor pipeline should provide an instruction stream to the execution units at a sufficient rate to utilize the additional execution units and actually improve the throughput.

The x86 architecture makes this task more difficult because the instructions of the instruction set are not fixed length; rather, the length of each instruction may vary. Thus, an x86 microprocessor needs to include an extensive amount of logic to process the incoming stream of instruction bytes to determine where each instruction starts and ends. Today's microprocessors typically fetch sixteen (16) bytes of data per cycle, since fetch lengths greater than sixteen impose considerable timing constraints in instruction formatting, such as determining instruction boundaries and prefix information, particularly as clock speeds rise. Further, the need for fetches beyond 16 bytes/cycle has traditionally not been a common requirement. However, the increasing popularity of multimedia in many types of digital devices has lead to a concomitant, seemingly annual, increase in multimedia instructions, and thus some chip manufacturers have used different approaches to handling fetches beyond 16 bytes (e.g., 32 byte fetches). Unfortunately, solutions have generally resulted in the need for wholesale recovery mechanisms based on errors when encountering self-modifying code or some alias cases, or large and enormously complicated caches with lower-than-expected performance. Thus there is a need to handle fetches beyond 16 bytes without sacrificing performance.

SUMMARY

In one embodiment, a microprocessor, comprising: an instruction cache configured to receive an instruction fetch comprising a first byte portion and a second byte portion; a side cache tag array configured to signal further processing of the second byte portion in addition to the first byte portion based on a hit of the side cache tag array; and a side cache data array configured to store instruction data for the second byte portion.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Various aspects of the invention can be better understood with reference to the following drawings. The components in the drawings are not necessarily to scale, with emphasis instead being placed upon clearly illustrating the principles of the present invention. Moreover, in the drawings, like reference numerals designate corresponding parts throughout the several views.

FIG. 3 is a flow diagram that shows an embodiment of an example side cache array method.

DETAILED DESCRIPTION

Figure 1A:
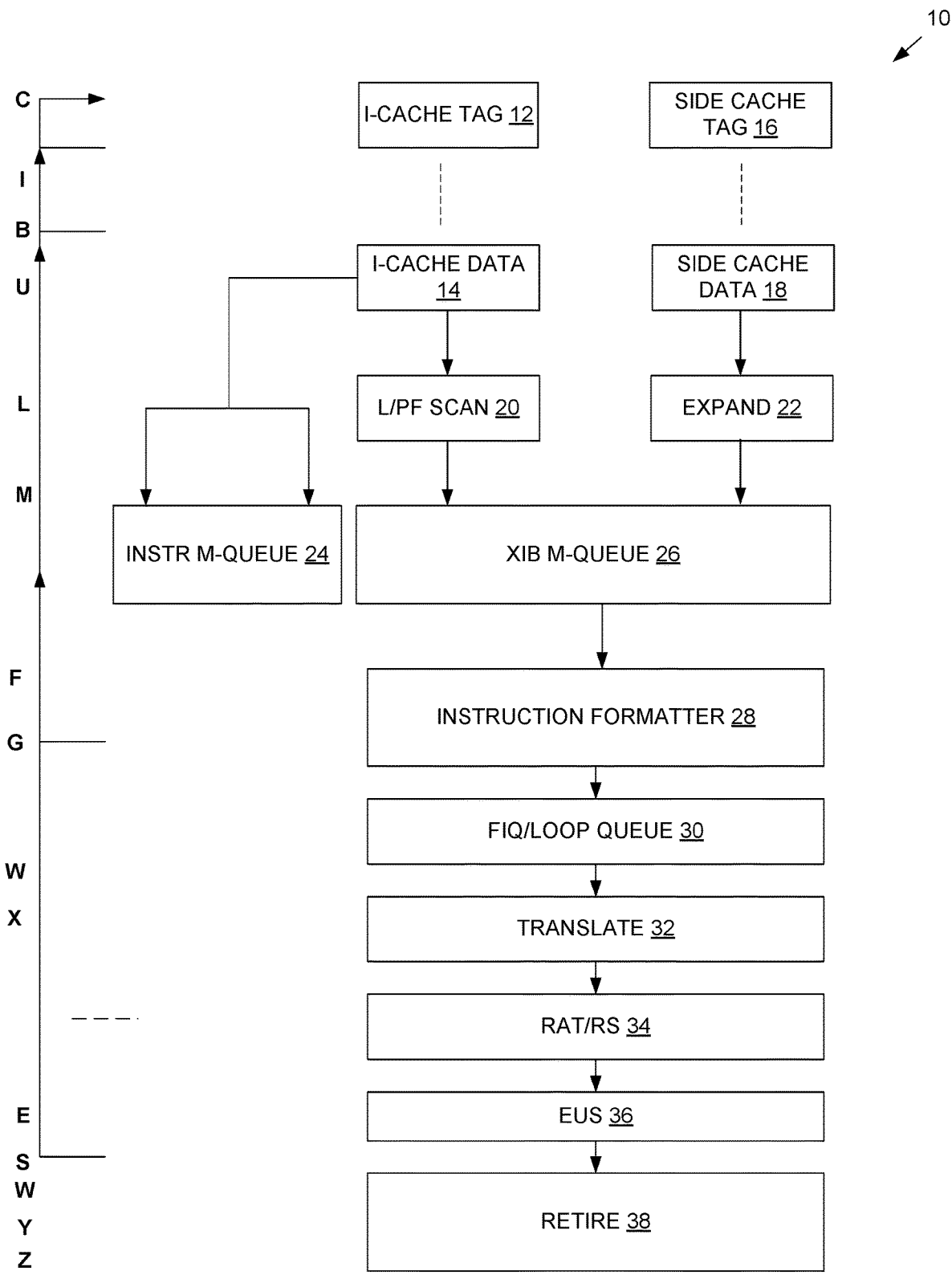
FIG. 1A is a block diagram showing an embodiment of an example side cache array system used in a microprocessor pipeline.

Certain embodiments of a side cache array system and method are disclosed that enable the efficient processing by a microprocessor of groups of instructions totalling more than sixteen (16) bytes in length, such as those found in multimedia code. In one embodiment, a side cache is implemented that only stores instruction information or data (e.g., instruction boundaries, prefix information, etc.) for the second byte portion (e.g., the second half) of a thirty-two (32) byte fetch, while allowing the regular logic to process the first portion (e.g., first half) of the 32 byte fetch. The tag and data array of the side cache reside in different pipe stages, where the side cache tag array is read early. A hit in the side cache tag array results in an increment of 32 bytes in the sequential fetch address of the instruction cache (I-cache) and staging of that data down to an XIB queue. Later, that hit to the side cache tag array also results in the instruction information to be written into the XIB queue with the calculated first byte portion. Through the use of the side cache, fetches of 32 bytes can be handled without the errors or large cache sizes found in other methods used to handle 32 byte fetches. Generally, certain embodiments of the side cache array system provides for better throughput in the presence of long instructions (e.g., AVX-type instructions, which can be 6 to 11 bytes long) that often result in a 4-instruction group exceeding 16 bytes.

Digressing briefly, though other mechanisms have been established for handling 32 byte fetches, there are shortcomings to those approaches. For instance, one method performs a slow scan of 16 bytes per fetch and then accumulates the instructions and instruction boundaries determined from those scans in the same cache. However, such a method is vulnerable to self modifying code or alias cases that render the start and end marks in error, requiring a slow and potentially error-prone recovery process. In some methods, a micro-op cache is created to enable more throughput. For instance, the micro-op cache serves as an independent, front end replacement (e.g., of the I-cache) with higher bandwidth (e.g., maximum of 4 micro-ops/cycle, or 6 micro-ops/cycle). However, the cache is very large and complex, and to incorporate such a solution is effectively requiring a re-design of most of the pipeline for many microprocessors. In contrast, certain embodiments of a side cache array system address the need for fetches of greater than 16 bytes by widening the I-cache fetch and using the side cache array to store the start/end/prefix information for the second portion of the 32 byte fetch while allowing the regular (e.g., L stage and M stage) logic to process the first portion, providing a simple approach using space saving techniques while enabling greater throughput (e.g., enables issuance of four x86 instructions/cycle for critical loops, even for instructions having an average length of eight (8) bytes long).

Having summarized certain features of a side cache array system of the present disclosure, reference will now be made in detail to the description of a side cache array system as illustrated in the drawings. While a side cache array system will be described in connection with these drawings, there is no intent to limit it to the embodiment or embodiments disclosed herein. That is, while the invention is susceptible to various modifications and alternative forms, specific embodiments thereof are shown by way of example in the drawings and will herein be described in detail sufficient for an understanding of persons skilled in the art. It should be understood, however, that the drawings and detailed description thereto are not intended to limit the invention to the particular form disclosed. On the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, modules, circuits, logic, or other components may be described as "configured to" perform a task or tasks. In such contexts, "configured to" is a broad recitation of structure generally meaning "having circuitry or another physical structure that" performs, or is capable of performing, the task or tasks during operations. The circuitry may be dedicated circuitry, or more general processing circuitry operating under the control of coded instructions. That is, terms like "unit", "module", "circuit", "logic", and "component" may be used herein, in describing certain aspects or features of various implementations of the invention. It will be understood by persons skilled in the art that the corresponding features are implemented utilizing circuitry, whether it be dedicated circuitry or more general purpose circuitry operating under micro-coded instruction control.

Further, the unit/module/circuit/logic/component can be configured to perform the task even when the unit/module/circuit/logic/component is not currently in operation. Reciting a unit/module/circuit/logic/component that is configured to perform one or more tasks is expressly intended not to invoke 35 U.S.C. § 112(f) for that unit/module/circuit/logic/component. In this regard, persons skilled in the art will appreciate that the specific structure or interconnections of the circuit elements will typically be determined by a compiler of a design automation tool, such as a register transfer language (RTL) compiler. RTL compilers operate upon scripts that closely resemble assembly language code, to compile the script into a form that is used for the layout or fabrication of the ultimate circuitry.

That is, integrated circuits (such as those of the present invention) are designed using higher-level software tools to model the desired functional operation of a circuit. As is well known, "Electronic Design Automation" (or EDA) is a category of software tools for designing electronic systems, such as integrated circuits. EDA tools are also used for programming design functionality into field-programmable gate arrays (FPGAs). Hardware descriptor languages (HDLs), like Verilog and very high-speed integrated circuit hardware description language (VHDL) are used to create high-level representations of a circuit, from which lower-level representations and ultimately actual wiring can be derived. Indeed, since a modern semiconductor chip can have billions of components, EDA tools are recognized as essential for their design. In practice, a circuit designer specifies operational functions using a programming language like C/C++. An EDA software tool converts that specified functionality into RTL. Then, a hardware descriptor language (e.g. Verilog) converts the RTL into a discrete netlist of gates. This netlist defines the actual circuit that is produced by, for example, a foundry. Indeed, these tools are well known and understood for their role and use in the facilitation of the design process of electronic and digital systems, and therefore need not be described herein.

FIG. 1A shows an embodiment of an example pipeline for a microprocessor 10. It should be appreciated that certain known components of a microprocessor 10 are omitted here for brevity and ease of explanation and illustration. As is known, the pipeline architecture provides for multiple instructions that are overlapped in execution, with each stage referred to as a pipe stage. The blocks shown in the pipeline may each be implemented according to one or more stages, those stages shown to the left of the blocks and represented in the depicted embodiment by the upper-case letters C, I, B, U, L, M, F, G, W, X, E, S, W, Y, and Z that are sequentially advanced from top-down and as redirected (as shown by the arrows). It should be appreciated by one having ordinary skill in the art that the number and/or arrangement of stages depicted in FIG. 1A is merely illustrative of one example embodiment, and that in some embodiments, a different number and/or arrangement of stages may be implemented and hence contemplated to be within the scope of the disclosure. It should also be appreciated by one having ordinary skill in the art that the blocks provide a general description of functionality for the pipeline, and that associated logic or circuitry known to those having ordinary skill in the art is omitted here for brevity. For instance, it should be appreciated by one having ordinary skill in the art that each stage of the pipeline may be separated by clocked pipeline registers or latches, as is known.

In one embodiment, the microprocessor 10 comprises an I-cache tag array 12, an I-cache data array 14, a side cache tag array 16, and a side cache data array 18. The microprocessor 10 further comprises a length/prefix (L/PF) scan logic 20, expand logic 22, an instruction mux (M) queue 24, and an XIB mux (M) queue 26. In one embodiment, the I-cache tag array 12, I-cache data array 14, side cache tag array 16, side cache data array 18, L/PF scan logic 20, expand logic 22, instruction M queue 24, and XIB M queue 26 comprise the side cache array system, though in some embodiments, fewer or more logic components may make up the side cache array system. The microprocessor 10 further comprises an instruction formatter 28, a formatted instruction queue (FIQ)/loop queue 30, a translate logic 32, register alias table/reservation stations (RAT/RS) 34, execution units 36, and retire logic 38.

Figure 1B:
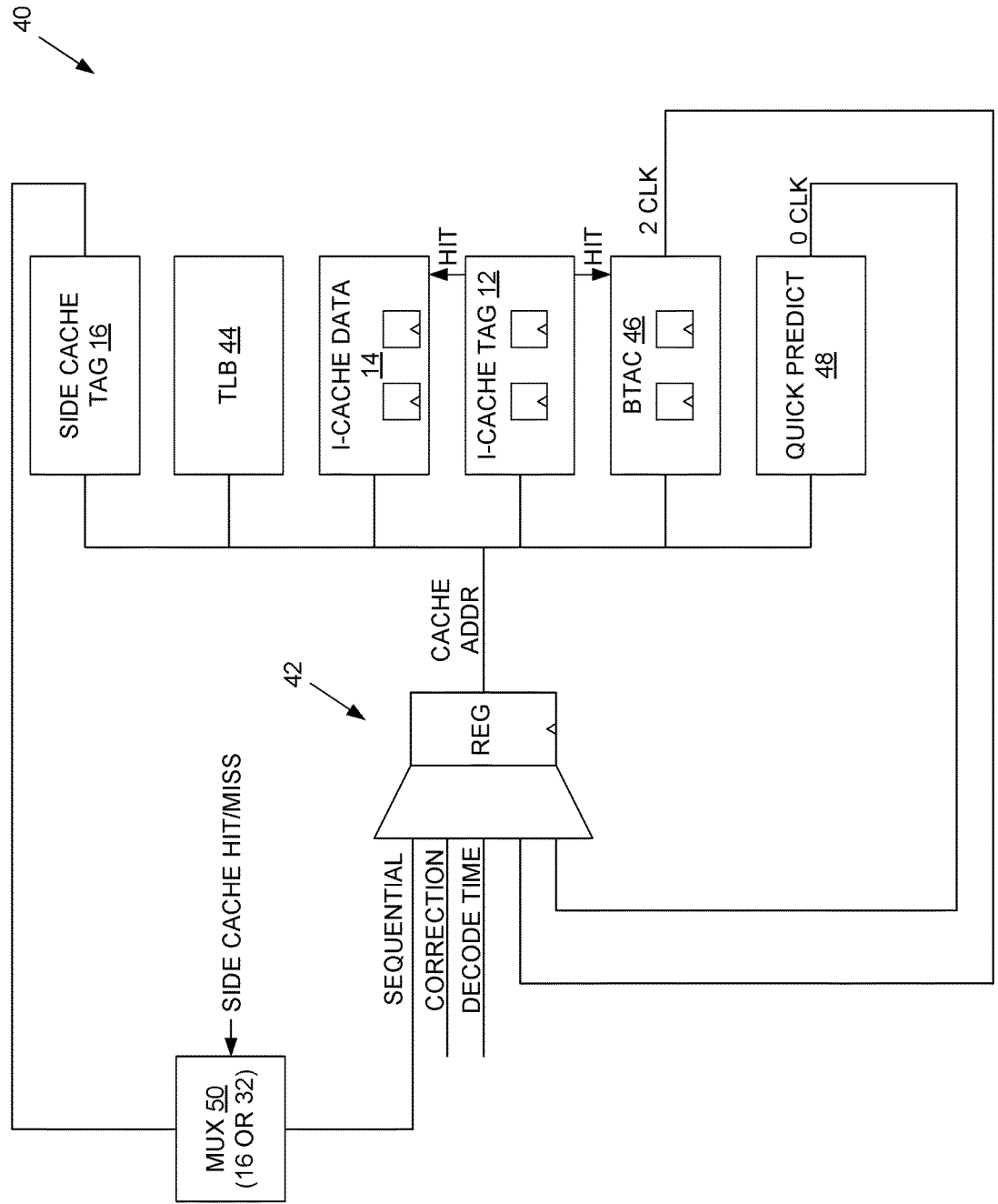
FIG. 1B is a schematic diagram showing an example front end of the microprocessor pipeline shown in FIG. 1A.

In one embodiment, the I-cache tag array 12 and the side cache tag array 16 are implemented at the C stage. Referring to FIG. 1B, shown are example sources used at a front end 40 of the pipeline shown for the microprocessor 10 of FIG. 1A. The front end 40 comprises a fetch unit 42 (e.g., including a mux and clocked register), the side cache tag array 16, a translation lookaside buffer (TLB) 44, the I-cache data array 14, the I-cache tag array 12, a branch target access cache (BTAC) 46 (e.g., part of the pipeline but not shown in FIG. 1A), a quick predictor 48 (e.g., part of the pipeline as well but not shown in FIG. 1A), and a mux 50. The fetch unit 42 receives plural sources of cache instruction addresses, including a sequenced instruction address, corrected instruction address (e.g., from the S stage), decode time instruction address (e.g., from the G stage), and addresses from the BTAC 46 and quick predictor 48. The output of the fetch unit 42 is a cache address that is provided as inputs to the side cache tag array 16, the TLB 44, I-cache data array 14, I-cache tag array 12, BTAC 46, and quick predictor 48 for accessing the next instruction of the I-cache data array 14.

Digressing briefly, the quick predictor 48 comprises a single cycle branch predictor that provides for single cycle prediction (e.g., takes one cycle to produce a target address, the prediction provided at the I stage in one embodiment). In one embodiment, the quick predictor 48 comprises a table (also referred to herein as array or target array) that stores branch target addresses of previously executed branch instructions, the table enabling a branch prediction when the stored branch instructions are subsequently encountered. In one embodiment, the table comprises 128 entries, though tables of other sizes (e.g., 64 entries, 32 entries, etc.) may be used in some embodiments. The table is organized as an n-way (e.g., n is an integer greater than one) set associative cache. Generally, an n-way set associative cache is also referred to herein as a multi-set associative cache. In one embodiment, each entry stores eight (8), 3-bit counters and the current local branch pattern, the counter chosen by a 3-bit local branch pattern. The quick predictor 48 further comprises a conditional branch predictor that is accessed in parallel with the table and that provides a taken/not taken direction for conditional branches. The quick predictor 48 further comprises a return stack that can provide a target instead of the table. In one embodiment, the return stack comprises four (4) entries and provides the target for return instructions. Note that the specifications listed above are merely for illustration, and that some embodiments may perform under different specifications and hence are contemplated to be within the scope of the invention. The quick predictor 48 is configured to deliver a predicted branch target immediately (within a single cycle) with no taken branch penalty. In some embodiments, the quick predictor 48 may operate according to other specifications for its prediction mechanism and/or table configuration, or in some embodiments, may be omitted. Most branches are correctly predicted by the quick predictor 48. In some embodiments, where the quick predictor 48 provides a branch prediction that differs (e.g., difference in direction and/or target) from the branch prediction of the BTAC 46 based on the same fetched branch instruction, the BTAC 46 overrides the branch prediction of the quick predictor 48 and updates the quick predictor table within the set of stages of the BTAC 46, for instance, at the U stage, with the branch prediction information (e.g., direction, target address, branch prediction type) provided by the BTAC 46.

The I stage and/or B stage correspond to access to the various tables of the pipeline, including in some embodiments muxing out the direction or way from the tables (e.g., based on the tags) and reading out of the instructions.

The BTAC 46 holds information about previously executed branch instructions that it uses to predict the target address, direction, and type during subsequent executions. The BTAC 46 comprises one or more tables that are much larger than the table of the quick predictor 48. In one embodiment, the BTAC 46 comprises a 4 k entry, m-way set-associative table (also referred to herein as array or target array), where m is an integer greater than one. Similar to n-way set-associative tables, m-way set-associative tables may also be referred to herein as multi-set associative tables. Each entry of the BTAC 46 comprises a valid bit, a branch target address prediction, a direction prediction, and a branch type. The branch type specifies whether the branch instruction is a call/return, indirect branch, conditional relative branch, or unconditional relative branch. In one embodiment, the BTAC 46 comprises or cooperates with a conditional relative branch predictor (or simply, conditional branch predictor) having a multiple entry (e.g., 12 k) tagged geometric (TAGE)-based conditional branch predictor, multiple tables, a multi-bit (e.g., 3 bit), taken/not taken (T/NT) counter, and multi-bit global branch history. That is, the TAGE conditional branch predictor comprises tagged tables with geometrically increasing branch history lengths, as is known. As another example, the indirect prediction comprises a multiple entry (e.g., 1.5 k) TAGE predictor and uses the table entries for static indirect branches. In one embodiment, two TAGE conditional branch predictors are used, one for side A and one for side B in a predictor array. The TAGE conditional branch predictor may be part of the BTAC or used in conjunction with the BTAC 46.

The TLB 44, under management by a memory management unit (not shown), provides for a virtual to physical page address translation as is known. That is, the TLB 44 stores the physical addresses of the most recently used virtual addresses. The TLB 44 receives a linear address from a segmentation unit (which converts the logical address from a program into the linear address), and a portion of the linear address is compared to the entries of the TLB 44 to find a match. If there is a match, the physical address is calculated from the TLB entry. If there is no match, a page table entry from memory is fetched and placed into the TLB 44.

The I-cache data array 14 comprises a level 1 cache of instructions that have been fetched or prefetched from L2, L3 or main memory. The I-cache data array 14 comprises multiple clocked registers.

The I-cache tag array 12 comprises an array of tags corresponding to the instructions in the I-cache data array 14, and comprises multiple clocked registers, and is used to determine a match between information associated with the fetched cache instruction (e.g., the tag or portion of the cache address) to the I-cache data array 14 and BTAC 46.

More relevant to the side cache array system, the I-cache tag array 12 and the side cache tag array 16 are implemented in some embodiments in parallel (e.g., at the C stage), along with the other processes including sending the address to the I-cache data array 14, TLB 44, quick predictor 48, and BTAC 46. Notably, the side cache tag array 16 is separate from the side cache data array 18, the latter implemented in a different stage (e.g., the U stage). The I-cache data array 14 is configured to provide 32 bytes of data, but for most processes, handles fetches in 16 bytes/cycle. A hit at the side cache tag array 16 signals to the mux 50 to select 32 bytes (instead of 16 bytes), and the sequential address is incremented 32 bytes instead of 16. A miss at the side cache tag array 16 signals to the mux 50 to increment the address by 16 bytes. In other words, the mux 50 is configured, based on whether there is a hit or not in the side cache tag array 16, to select either 32 bytes or 16 bytes, where the sequential address is incremented accordingly to the fetch unit 42.

Referring again to FIG. 1A, before proceeding with additional description of the side cache array system, the logic for handling the first 16 bytes (followed by the balance of the pipeline) is briefly described. For the first 16 byes-bytes of data from the 32 byte fetch, the L/PF scan logic 20, XIB M queue 26, and the instruction formatter 28 provide XIB and decode functionality associated with stages L (length), M (mux), and F (format) of the pipeline. The L/PF scan logic 20 determines and marks the beginning and ending byte of each instruction (L stage) within the stream and thereby break breaks up the stream of bytes into a stream of x86 instructions, which is staged at the XIB M queue 26 (M-stage) before providing to decoding functionality at the F stage of the instruction formatter 28. Note that additional information on XIB functionality and the L, M, and F stages may be found in U.S. Pat. No. 8,612,727, incorporated herein by reference in its entirety to the extent consistent with the current disclosure.

The FIQ/loop queue 30 receives the formatted instructions and buffers them until they can be translated into microinstructions. The FIQ/loop queue 30 also provides for a preliminary decoding and fast looping function (e.g., on a BTAC loop branch, the loop queue is activated and loop instructions are repeatedly sent).

The W stage provides for an optional extra timing clock.

At the X stage, the instruction translator 32 translates (in the X or translate stage) the formatted instructions stored in the FIQ/loop queue 30 into microinstructions.

The instructions are provided in program order to a register alias table/reservation station (RAT/RS) tables 34. The RAT functionality of the RAT/RS 34 maintains and generates dependency information for each instruction. The RAT functionality of the RAT/RS 34 renames the sources and destinations of the instructions onto internal registers, and dispatches the instructions to reservation stations of the RAT/RS 34, which issue the instructions, potentially out of program order, to functional units, or execution units (EUs) 36. The execution units 36, which include integer units, execute branch instructions at stage E (execution). Execution units, branch units, and integer units are terms that are used interchangeably herein. In one embodiment, the execution units 36 (e.g., two execution units) execute two branches in a single clock cycle. The execution units 36 also indicate whether the BTAC 46 has correctly predicted the branch instruction.

Results of the execution are provided to the retire logic 38. In one embodiment, the retire logic 38 comprises a reorder buffer (not shown), which comprises information pertaining to instructions that have been executed. As is known, the reorder buffer keeps the original program order of instructions after instruction issue and allows result serialization during a retire stage. In one embodiment, some of the information of the reorder buffer may be stored elsewhere along the pipeline, such as at the instruction formatter 28. Information stored in the reorder buffer may include branch information, such as type of branch, branch patterns, targets, the tables used in the prediction, and cache replacement policy information (e.g., least recently used or LRU). The retire logic 38 may further comprise a branch table update, which comprises stages S, W, Y, and Z, and is configured to update (e.g., at the S stage) the various tables at the front end (e.g., BTAC) with information about the fully decoded and executed branch instruction (e.g., the final result of the branch). The update may involve, at stages S, W Y, and Z, a table read, a target address write, and a counter increment or decrement, which may involve some delays. In one embodiment, the branch table update provides an indication of a misprediction for a given conditional branch instruction and the side (e.g., A, B, or C) in which the conditional branch instruction is cached.

Referring again to relevant functionality for the side cache array system, in one embodiment, the side cache data array 18 comprises 2-way, 64 entry tables or arrays, each entry comprising 2 KB of instruction data. The side cache data array 18 stores instruction boundaries (e.g., start, end), accumulated prefixes, branch information (e.g., where the BTAC branches are in the fetch), and breakpoint marks. The instruction data stored in the side cache data array 18 is stored in compressed form by storing markers for the second half 16 bytes in a manner that is approximately half the size it otherwise would be (e.g., if stored in the format of the XIB M queue 26). Responsive to a hit in the side cache tag array 16, instruction information or data (e.g., instruction boundaries, prefix information, etc.) associated with the latter half of the 32 byte fetch is staged to the side cache data array 18, processed by the expand logic 22, and written to the XIB M queue 26. The data for the first 16 bytes of the 32 byte fetch is handled by the L/PF scan logic 20 after which it is written to the XIB M queue 26, and the raw data from the I-cache data array 14 (e.g., that is not stored in the side cache data array 18) is staged to the instruction data M queue 24. Note that processing of the I-cache data (e.g., for the first 16 bytes) is performed along the non-side cache branch (on the left side in FIG. 1A) in standard fashion. The L/PF scan logic 20 determines instruction lengths and accumulates prefixes, which may amount to 10-15 different types in x86 based instructions. For instance, based on a scan of the instruction, prefixes are identified (e.g., at hex 66, 67, 2E, 3E, etc.), and may include OS, AS, REX presence and their variations, etc., as described in U.S. Pat. No. 8,612,727, incorporated herein by reference in its entirety. The L/PF scan logic 20, in conjunction with the XIB M queue 26, accumulates one or more of these prefixes and attaches or associates them with the opcode byte. Accordingly, the scan enables a determination of instruction length (e.g., starting at the opcode byte) and all of the prefixes affecting that instruction. The L/PF scan logic 20 uses standard or normal L-stage logic, as explained in the above-referenced patent incorporated by reference, to process the first half or portion of the 32 byte fetch (i.e., the first 16 bytes). That is, the L/PF scan logic 20 scans the information from the I-cache data array 14, produces the appropriate markers, and writes the information to another entry of the XIB M queue 26. In other words, the L/PF scan logic 20 and the expand logic 22 write respective entries to the XIB M queue 26.

Side cache entries are written, based on a prior scan, according to certain conditions (e.g., side cache miss, odd 16 byte address signifying the second half of a 32 byte fetch, and not being the target of a branch). In general, since the prefix information can add considerably to the size of each instruction (e.g., 15 bits per byte), as can the branch information (e.g., whether there is a branch, whether it is taken or not taken), the total number of possible bits may be 20 bits×16 bytes. Though some embodiments may store all of those bits in the side cache data array 18, in some embodiments, only a fraction of the information is stored. The side cache data array 18 stores a compressed, per instruction version of this instruction information, and also limits the amount of instructions where the side cache data array 18 is utilized (e.g., 5 or fewer instructions, which in some embodiments is programmable). In other words, one purpose of the side cache array system is to handle long-length instructions where the typical 16-byte fetch bandwidth is not sufficient to handle a group of these types of instructions. To preserve the side cache entries for circumstances where needed (e.g., for 8-10 byte long instructions extracted from the instruction cache data array 14), the side cache data array 18 is configured to store a limited amount of instruction data with enough bit capacity in each entry to represent via bit representations the various marks—start, end, prefixes—per instruction byte. That the compressed format enables the storage of, instead of sixteen sets of 15 bits, only 5 sets of these bits, as described further below in association with FIG. 2. That is, the side cache data array 18 need only store 5 possible start bits, five possible end bits, 5 possible break point markers, and 5 possible prefix markers in one embodiment. Instead of having 240 bits for all of the prefixes, there are only 75 bits. Accordingly, certain embodiments of a side cache array system are intended to handle a predetermined or programmable quantity of instructions, and for the sake of illustration, a quantity of five instructions will be used as the maximum limit to handle in the side cache data array 18, with the understanding that other limits may be used in some embodiments. In general, the side cache data array 18 stores markers (e.g., bit representations) for start and end for an instruction, breakpoints, branch information, and prefix information. Notably, the side cache data array 18, with storage of markers as opposed to I-cache data, is smaller than an instruction cache with prefix information and various markers embedded therein.

The compressed instruction information from the side cache data array 18 is then expanded by expand logic 22 to a format suitable for use by the XIB M queue 26. For instance, the expand logic 22, before writing to the XIB M queue 26, knows to attach start and/or end bits and other instruction information for each of the instruction bytes. In effect, the output of the expand logic 22 comprises the result of a length scan (mark every byte with a start or end byte), markings indicating whether there is a BTAC branch on it, whether there is a breakpoint, and an identification of one or more prefixes associated with the instruction byte. For instance, if the first instruction starts at (hex shorthand) byte 2, the prefix data is attached, and then on to the next instruction to determine whether certain bits need to be attached and so on. The result is an output to the XIB M queue 26 according to one entry for this expanded information for the second half or portion of the 32 byte fetch.

The instruction M queue 24 tracks along with the XIB M queue 26, and in one embodiment, comprises a part of the XIB M queue 26. The instruction M queue 24 receives the raw, unmodified data from the instruction cache data array 14. The instruction M queue 24 contains the instruction bytes for staging down to decoders of the instruction formatter 28. For the 16 byte fetch scenario, there is a single write entry to the instruction M queue 24. For the 32 byte fetch scenario, there are two entries written to the instruction M queue 24.

In the XIB M queue 26, each byte has associated with it the expanded marks including 19 bits for each 16 byte per entry and corresponding to start, end, whether it is a branch, a data break point and prefix type or types (e.g., OS, AS, 2E, 3E, segment override prefixes, etc.). For instance, 15 bits correspond to prefixes, and 4 bits for start, end, branch, and break point. The XIB M queue 26 further comprises approximately 6-12 entries in some embodiments. The XIB M queue 26 is read to feed the M stage where instructions are actually muxed and whole stages consumed for formatting at the F stage.

Control logic for certain embodiments of a side cache array system provides for certain checks on updates to the side cache array system. For instance, writes to a new side cache entry are implemented when there is a side cache tag array miss, the fetch involves an odd 16B address (e.g., signifying the second half of a 32 byte fetch) and is not a target of a branch (e.g., exclude the target of a branch because, in that case, all of the start/end/prefix markers will not be available since the entire fetch is not scanned, just a portion after the branch target). For instance, when branching to a point in the middle of a 16 byte fetch, a full scan for instruction boundaries will not occur, and as such, a full set of start, end, and prefix data will not be available to write into the side cache data array 18. Accordingly, where the side cache entry would involve the target of a branch, such is excluded from a side cache entry. Additionally, certain embodiments of a side cache array system may limit (e.g., through the use of a feature control register, scan, fuse, etc.) the use of the side cache data array 18 to regions of code of a predetermined or programmable quantity of instructions per 16 bytes. For instance, where there are more than five instructions per 16 bytes, to avoid exceeding byte fetch per clock bandwidths (e.g., 16 bytes per clock cycle fetch), the side cache data array entries may be limited to some predetermined or configurable number of instructions (e.g., 3-5). Also, a side cache data array entry, or in some embodiments, the entire side cache data array 18, is invalidated on an I-cache data array cast out (e.g., where data is evicted from the I-cache data array 14, there needs to be a corresponding entry invalidated in the side cache data array 18, so as to avoid improper aliases), snoop invalidate (e.g., via a signal sent from the I-cache data array 14), TLB invalidate, or an OS/AS prefix default change (e.g., which affects instruction length). It is noted that since the side cache array system works in parallel with the instruction cache, it is known by the U stage both when there is a cache hit and if there is a cast out or invalidating event.

Figure 2:
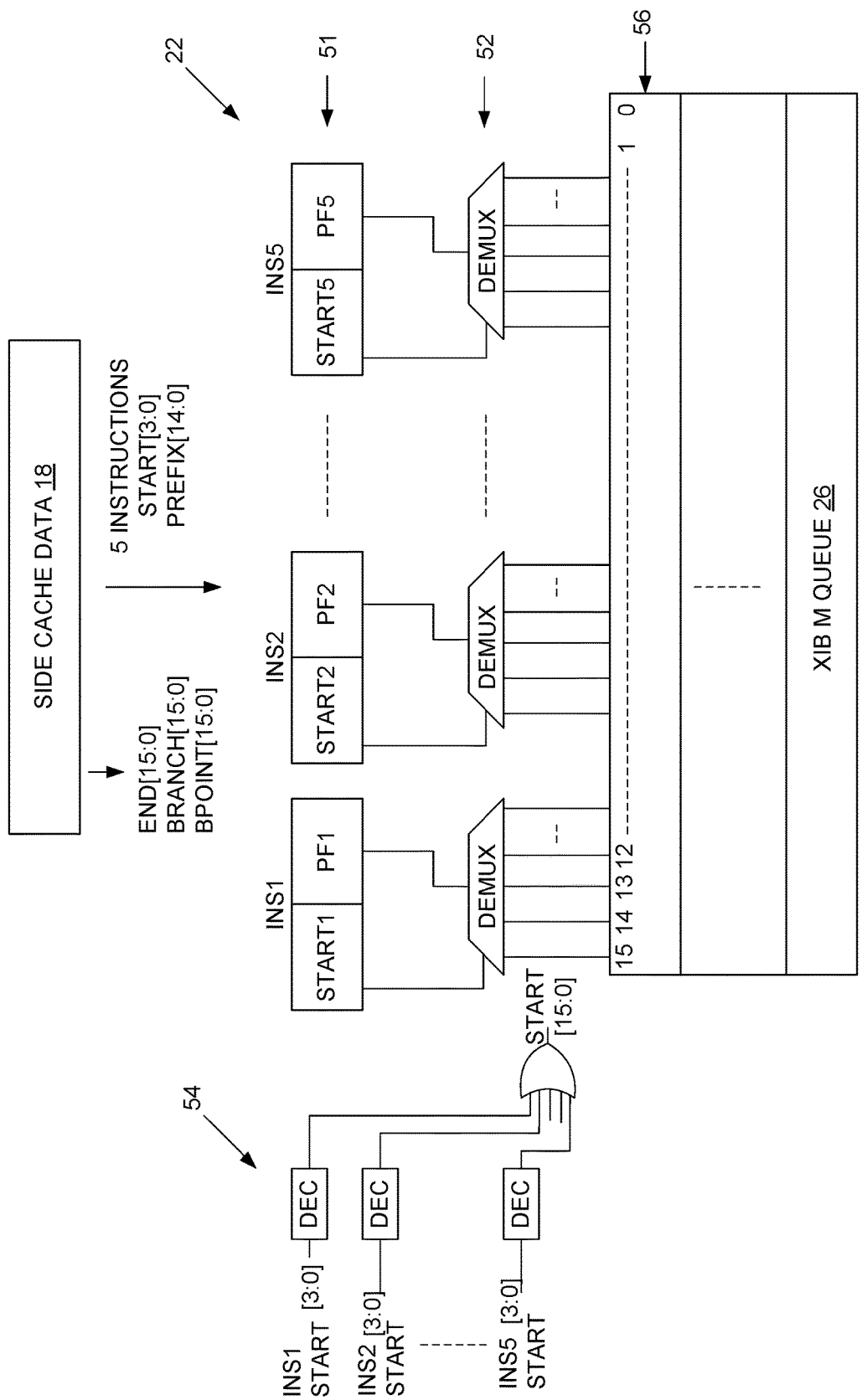
FIG. 2 is a schematic diagram that shows an embodiment of example expansion logic used in a side cache array system.

Referring now to FIG. 2, shown is a schematic illustration of side cache entry expansion, such as performed by the expand logic 22. In particular, shown is the side cache data array 18, illustrations of prefix buses 51 corresponding to five instructions with start and prefix information, demultiplexers 52 for the instructions, the XIB M queue 26, and decode OR logic 54. Note that the use of five instructions as a condition for implementing an embodiment of a side cache array system is used for illustration, and that other limits may be imposed in some embodiments. The data stored in the side cache data array 18 is in a format shown representatively on the left hand side beneath the side cache data array 18 in FIG. 2, and comprises end bit markers for bytes 15 through 0 (end[15:0]), branch markings for bytes 15 through 0 (branch[15:0]), and breakpoint markings for bytes 15 through 0 (bpoint[15:0]). These markings are in a form used by the XIB M queue 26, and hence are also stored directly to the XIB M queue entry 56 as shown. The expand logic 22 decodes and performs a logical OR operation to expand encoded start points for each of the five instructions into the XIB M queue format, as shown by the decode OR decode logic 54 and Ins1start[3:0], Ins2start[3:0], . . . Ins5start[3:0]. For instance, the start bits for the 5 instructions are decoded from, for instance, 4 bit versions into 16 bit versions. These 16 bit versions are ORed together to create the Start[15:0] format in the XIB M queue entry. Note that keeping the start bits per-instruction in this format, in the side cache data array 18, does not save space, but it enables an expansion of the prefix buses into format suitable for the XIB M queue 26.

Focusing attention on the center of FIG. 2, from the side cache data array 18 are data for five instructions each comprising a 4 bit start [3:0] and a 15 bit prefix [14:0], and what is being illustrated is a steering of the prefix buses 51 using demultiplexers 52 to create a format suitable for use in the XIB M queue 26 (e.g., prefixes attached to each instruction, including Ins1 Prefix[14:0], Ins2Prefix[14:0], . . . Ins5Prefix[14:0]). For instruction 1, the start1 field has a value between 0 and 15. Based on this value, the ins1 prefixes (PF1) is steered to one of the 16 sections of the XIB M queue entry 56 being written. For instance, if Start1 [3:0]==1100, then PF1 [14:0] is steered to the byte 12 section of the XIB M queue entry 56 being written. The same is done for each of the five instructions. The data from each of the instructions is ORed together to create the M queue entry write data. That is, each demultiplexer (demux) 52 feeds the inputs to the XIB M queue 26 (e.g., the 16 sections of the XIB M queue 26 input that the Ins1 demux feeds are also fed by demuxes for Ins2, Ins3, etc., which are ORed together (e.g., in RTL)).

Note that only a single entry of the XIB M queue 26 is shown. In a practical implementation, there may be six (6) or more entries in this queue. Each byte needs 1 bit each stored for start, end, branch, and breakpoint plus 15 bits for prefixes. In one embodiment, each entry is 16×19 or 304 bits wide that may also include some other data that is inconsequential to this description.

In view of the above description, it should be appreciated by one having ordinary skill in the art that a side cache array method, denoted method 58 in FIG. 3 and implemented in one embodiment by the microprocessor, comprises: receiving at an instruction cache an instruction fetch comprising a first byte portion and a second byte portion (60); signaling further processing by a side cache tag array of the second byte portion in addition to the first byte portion based on a hit of the side cache tag array (62); and storing at a side cache data array instruction data for the second byte portion (64).

Any process descriptions or blocks in flow diagrams should be understood as representing modules, segments, logic, or portions of code which include one or more executable instructions for implementing specific logical functions or steps in the process, and alternate implementations are included within the scope of the embodiments in which functions may be executed out of order from that shown or discussed, including substantially concurrently or in different order, depending on the functionality involved, as would be understood by those reasonably skilled in the art of the present disclosure.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

Note that various combinations of the disclosed embodiments may be used, and hence reference to an embodiment or one embodiment is not meant to exclude features from that embodiment from use with features from other embodiments. In the claims, the word "comprising" does not exclude other elements or steps, and the indefinite article "a" or "an" does not exclude a plurality.

The invention claimed is:

1. A microprocessor, comprising:
   an instruction cache configured to receive an instruction fetch comprising a first byte portion and a second byte portion, wherein the first byte portion and the second byte portion are different parts of the instruction fetch;
   a side cache tag array configured to signal processing of the second byte portion in addition to the first byte portion based on a hit of the side cache tag array; and
   a side cache data array configured to store instruction data for the second byte portion, wherein the instruction data stored in the side cache array comprises an indication of instruction boundaries, an indication of accumulated prefixes, an indication of a branch, and an indication of breakpoint marks.

2. The microprocessor of claim 1, wherein the side cache data array is configured to store the instruction data in compressed form.

3. The microprocessor of claim 2, further comprising expand logic configured to expand the instruction data from compressed form to expanded form.

4. The microprocessor of claim 3, wherein the expanded form comprises the instruction data in a format suitable for storage in an XIB mux queue.

5. The microprocessor of claim 4, further comprising the XIB mux queue, the XIB mux queue configured to receive the expanded instruction data corresponding to the second byte portion from the expand logic.

6. The microprocessor of claim 1, further comprising processing the instruction data of the side cache data array, wherein the side cache data array is located at a later stage in a pipeline of the microprocessor than the side cache tag array.

7. The microprocessor of claim 1, further comprising length and prefix scan logic configured to process instruction cache data corresponding to the first byte portion by performing a length determination and prefix scanning of the instruction cache data corresponding to the first byte portion, the instruction cache data comprising more bits of information than the side cache data.

8. The microprocessor of claim 7, further comprising an XIB mux queue configured to receive the processed instruction cache data.

9. The microprocessor of claim 1, further comprising a mux queue configured to receive raw instruction data from the instruction cache corresponding to the first byte portion and the second byte portion.

10. The microprocessor of claim 1, wherein the first byte portion and the second byte portion each comprises sixteen (16) bytes.

11. The microprocessor of claim 1, wherein the instruction fetch comprising the first byte portion and the second byte portion corresponds to instructions for multimedia processing.

12. A method implemented by a microprocessor, the method comprising:
   receiving at an instruction cache an instruction fetch comprising a first byte portion and a second byte portion, wherein the first byte portion and the second byte portion are different parts of the instruction fetch;
   signaling processing of the second byte portion, in addition to processing of the first byte portion, based on a hit of a side cache tag array; and
   storing at a side cache data array instruction data for the second byte portion, wherein the instruction data stored in the side cache array comprises an indication of instruction boundaries, an indication of accumulated prefixes, an indication of a branch, and an indication of breakpoint marks.

13. The method of claim 12, further comprising storing the instruction data in the side cache data array in compressed form.

14. The method of claim 13, further comprising expanding the instruction data from compressed form to expanded form.

15. The method of claim 14, wherein the expanding comprises formatting the instruction data in a format suitable for storage in an XIB mux queue, further comprising receiving at the XIB mux queue the expanded instruction data corresponding to the second byte portion.

16. The method of claim 12, further comprising processing the instruction data of side cache data array after the hit at the side cache tag array.

17. The method of claim 12, further comprising determining a length of, and an identification of a prefix of, the instruction cache data based on scanning the instruction cache data corresponding to the first byte portion, the instruction cache data comprising more bits of information than the side cache data.

18. The method of claim 17, further comprising:
- receiving at an XIB mux queue the processed instruction cache data; and
- receiving at a mux queue raw instruction data from the instruction cache corresponding to the first byte portion and the second byte portion.

* * * * *